United States Patent
Embler

(10) Patent No.: US 6,654,054 B1
(45) Date of Patent: Nov. 25, 2003

(54) METHOD AND APPARATUS FOR CANCELING THE EFFECTS OF NOISE IN AN ELECTRONIC SIGNAL

(75) Inventor: Gary Embler, Palo Alto, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 09/431,481

(22) Filed: Nov. 2, 1999

(51) Int. Cl.⁷ ............................................. H04N 5/217
(52) U.S. Cl. ...................................... 348/241; 348/247
(58) Field of Search ................................ 348/241, 243, 348/244, 245, 246, 247, 252, 254; 382/275; 358/533, 529, 523

(56) References Cited

U.S. PATENT DOCUMENTS

| | | | |
|---|---|---|---|
| 4,884,129 A | | 11/1989 | Ozawa et al. |
| 5,047,863 A | | 9/1991 | Pape et al. |
| 5,132,801 A | * | 7/1992 | Yamano ..................... 348/245 |
| 5,555,021 A | | 9/1996 | Igarashi |
| 5,625,413 A | | 4/1997 | Katoh et al. |
| 5,796,430 A | | 8/1998 | Katoh et al. |
| 6,046,771 A | * | 4/2000 | Horii ........................... 348/243 |
| 6,061,092 A | * | 5/2000 | Bakhle et al. ............... 348/243 |
| 6,307,393 B1 | * | 10/2001 | Shimura ..................... 348/247 |
| 2002/0008766 A1 | * | 1/2002 | Tariki .......................... 348/243 |

* cited by examiner

Primary Examiner—Aung S. Moe

(57) ABSTRACT

A method and apparatus for canceling the effect of radiated noise on an electronic signal is disclosed. Particularly, in an electronic camera, a noise cancellation circuit consisting of a control means for controlling the timing of a radiated noise signal generated by a noise-generating source, a storage means for storing an anti-noise signal that comprises a digital representation of a complement of the radiated noise signal; and a summing circuit for summing digital image signals containing the radiated noise signal component and the anti-noise signal are disclosed. The control means generates a control signal in synchronization with a pulse of a pixel sample clock. This control signal triggers the noise-generating source such that the radiated noise signal is also synchronized to the pulse of the pixel sample clock. The radiated noise signal is conducted into the electronic signal path. The summing circuit adds the anti-noise signal, being a complement of the radiated noise signal, to the image signal to cancel the effect of the radiated noise.

38 Claims, 6 Drawing Sheets

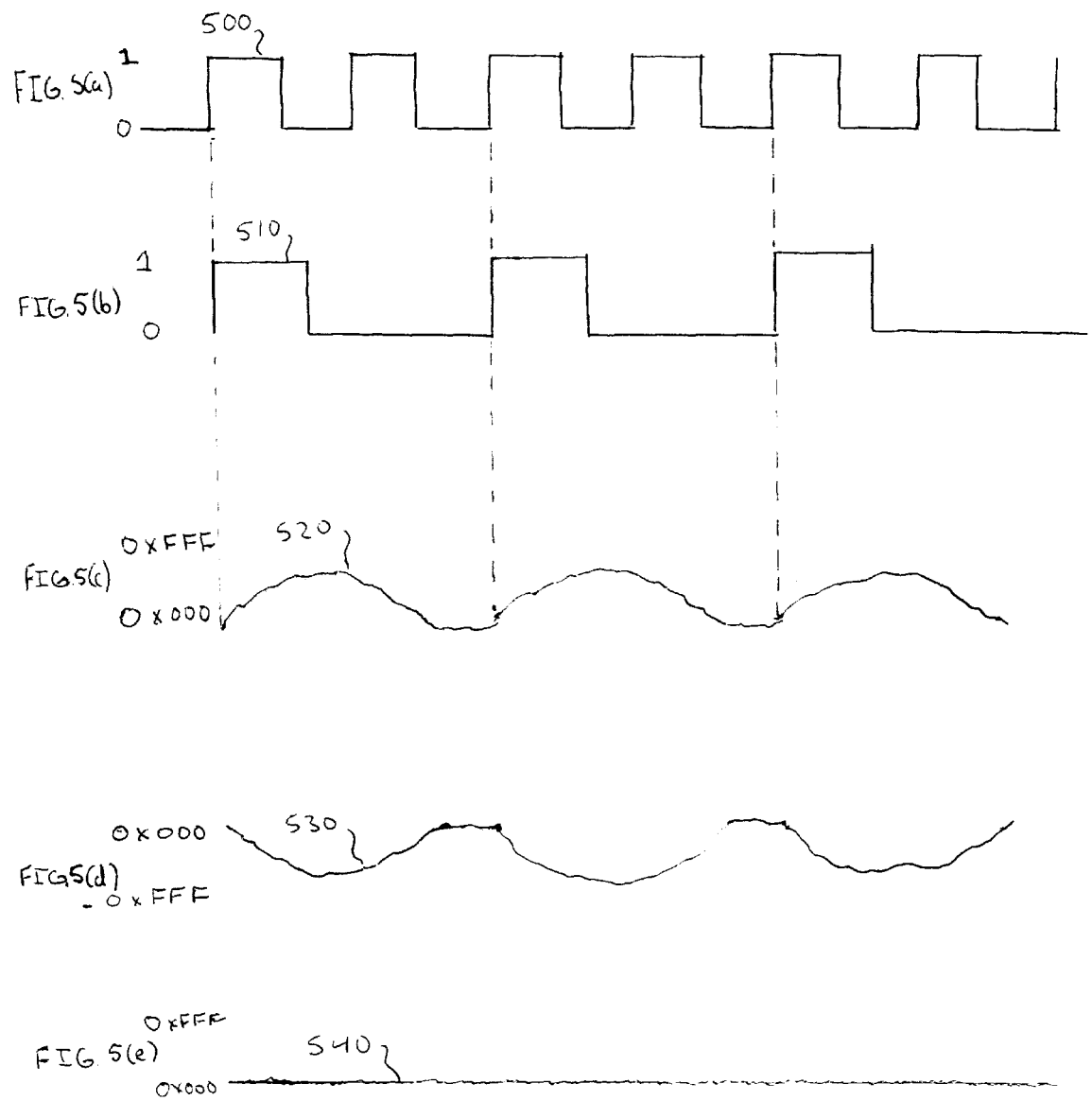

METHOD AND APPARATUS FOR CANCELING THE EFFECTS OF NOISE IN AN ELECTRONIC SIGNAL

FIELD OF THE INVENTION

The present invention generally relates to electronic signal noise cancellation. The invention relates more specifically to a method and apparatus for canceling the effect of radiated noise on an electronically reproduced image.

BACKGROUND OF THE INVENTION

A common problem in digital or electronic imaging is that during processing of an image, there is a possibility of noise contaminating the image. Typically, electronic imaging systems utilize an image sensor that converts incident light reflected from an object into electronic signals. Imperfections in the system acquiring the image may cause noise to be superimposed on the resulting electrical signal produced by the image sensor. As a result, an imperfect image is displayed.

The source of the noise could be intrinsic noise from the sensor itself or noise originating from elsewhere in the system. The noise-generating source may either radiate noise into the signal or cause noise to be conducted into the electronic signal path. Other potential sources of the noise could be power supplies, motor drivers or motors themselves. In the case of an electronic camera, the source could also be a battery charger or flash charger circuit. Generally, any power switching circuit having a transistor, diode, triac or other similar device is capable of producing sufficient noise to contaminate an actual image signal.

Since noise is annoying to users, and can produce imperfect images, and thus is undesirable in an electronic image, systems that eliminate noise are desirable. There are known methods for eliminating noise in electronic signals. U.S. Pat. No. 5,555,021 (Igarashi) discloses a compact television camera having a circuit that prevents switching noises by a transistor in a power supply circuit. Noise is prevented by switching the transmitter only during a blanking period where no video signal is being transmitted by the camera's image pickup device. A synchronizing signal is used to insure that switching of the transmitter occurs during the blanking period. The video signal is therefore not affected by any switching noise generated by the rising or falling edge of a transistor trigger signal that prompts switching and that occurs during the blanking period.

However, the Igarashi method, and others like it, are limited in that noise can only be reduced or eliminated by waiting for blanking intervals. This is problematic because blanking intervals may not always conveniently coincide with radiated noise, meaning that the noise-generating source cannot always be effectively and efficiently controlled. Also, the noise itself may have a duration longer than the blanking interval, meaning that there is no reduction of noise that occurs outside the blanking interval window.

There are also known methods for detecting defective pixels in an image, due to noise or other causes, and thereafter replacing signals having defective pixels. U.S. Pat. No. 5,625,413 (Katoh et al.) for example, discloses video camera circuitry that corrects defective pixels of a solid state image pickup device by detecting the noise causing the defective pixels when the video camera iris is in a closed state. In the Katoh detection process, the gain of an automatic gain control circuit is increased to provide for better detection of white spot noise, i.e. thermal energy that has been converted into undesirable electronic signals or that has been injected into the electronic signal path. Execution of the detection operation occurs during the period when the camera is powering on or off to reduce user annoyance and inconvenience. The detected defective signal is thereafter replaced based on a signal of a peripheral pixel. Detection circuitry, however, increases power consumption and can cause noise itself and is therefore a problem. Also, limiting detection circuitry to operation during closed iris states and power on/off intervals means that noise occurring during other intervals is effectively disregarded.

Accordingly, there is a need in the art for a noise cancellation approach that does not require noise detection circuitry.

There is also a need for a more efficient and precise noise cancellation apparatus and method that can be activated to combat noise at any time without restrictions linked to blanking or power on/off intervals.

There is a particular need for a noise cancellation approach that is well suited to the architecture of a digital camera.

SUMMARY OF THE INVENTION

The foregoing needs and objects, and other needs and objects that will become apparent from the following description, are achieved by the present invention, which comprises, in one aspect, a noise cancellation circuit for use in canceling radiated noise generated by a noise-generating source. In one embodiment, the noise cancellation circuit is implemented in a device having an analog-digital converter that receives and converts an analog signal into a plurality of digital signals, where the noise cancellation circuit comprises a control means for controlling the timing of radiated noise, where the radiated noise is radiated into the signal path of the analog signal such that the corresponding plurality of digital signals from the analog-digital converter include a signal component derived from the radiated noise; a storage means that stores an anti-noise signal that comprises a digital representation of a complement of the signal component derived from radiated noise; and a summing means for summing the plurality of digital signals output from the analog-digital converter that include the signal component derived from the radiated noise with the anti-noise signal.

According to one feature, the control means controls the timing of the radiated noise by sending a control signal to the noise-generating source, the control signal being sent in synchronization with a clock pulse and thereby causing the noise-generating source to generate the radiated noise also in synchronization with the clock pulse.

According to another feature, each select discrete point of the anti-noise signal has an instantaneous absolute magnitude that is substantially equal to that of a corresponding discrete point of the signal component derived from the radiated noise, and a signal polarity opposite that of the corresponding discrete point of the signal component derived from the radiated noise.

According to yet another feature, summing comprises adding digital values representative of said plurality of digital signals that include the signal component derived from the radiated noise with digital values representative of the anti-noise signal some predetermined time after a given clock pulse.

According to yet another feature, the radiated noise is isolated and measured.

According to yet another feature, the control means provides information to the storage means identifying the anti-noise signal, from among a plurality of anti-noise signals in the storage means, as the anti-noise signal to be delivered to the summing means.

According to yet another feature, the control means controls the timing of the delivery of the anti-noise signal delivered to the summing means by sending a control signal in synchronization with a clock pulse.

According to yet another feature, the radiated noise is generated by a power switching circuit.

In yet another aspect of the present invention, a method for canceling the effect of radiated noise on a signal is disclosed, comprising the steps of characterizing a signal component that is derived from radiated noise; creating and storing an anti-noise signal that comprises a digital representation of a complement of the signal component derived from the radiated noise; controlling the timing of the radiated noise, the radiated noise being radiated into the signal path of a signal; providing a digital representation of the signal that includes the signal component that is derived from the radiated noise; and summing the digital representation of the signal and the anti-noise signal.

BRIEF DESCRIPTION OF THE DRAWINGS

The present invention is illustrated by way of example, and not by way of limitation, in the figures of the accompanying drawings and in which like reference numerals refer to similar elements and in which:

FIG. 5(a) depicts pixel sample clock waveform pulses;

FIG. 5(b) shows waveforms of control signal pulses synchronized with the pulses shown in FIG. 5(a);

FIG. 5(c) shows representative waveforms generated by radiated noise;

FIG. 5(d) shows representative anti-noise waveforms for canceling the radiated noise waveforms in FIG. 5(c); and FIG. 5(e) shows a representative resultant waveform.

DETAILED DESCRIPTION OF THE PREFERRED EMBODIMENT

A method and apparatus for noise cancellation is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Overview of Digital Camera Architecture

Figure 1:
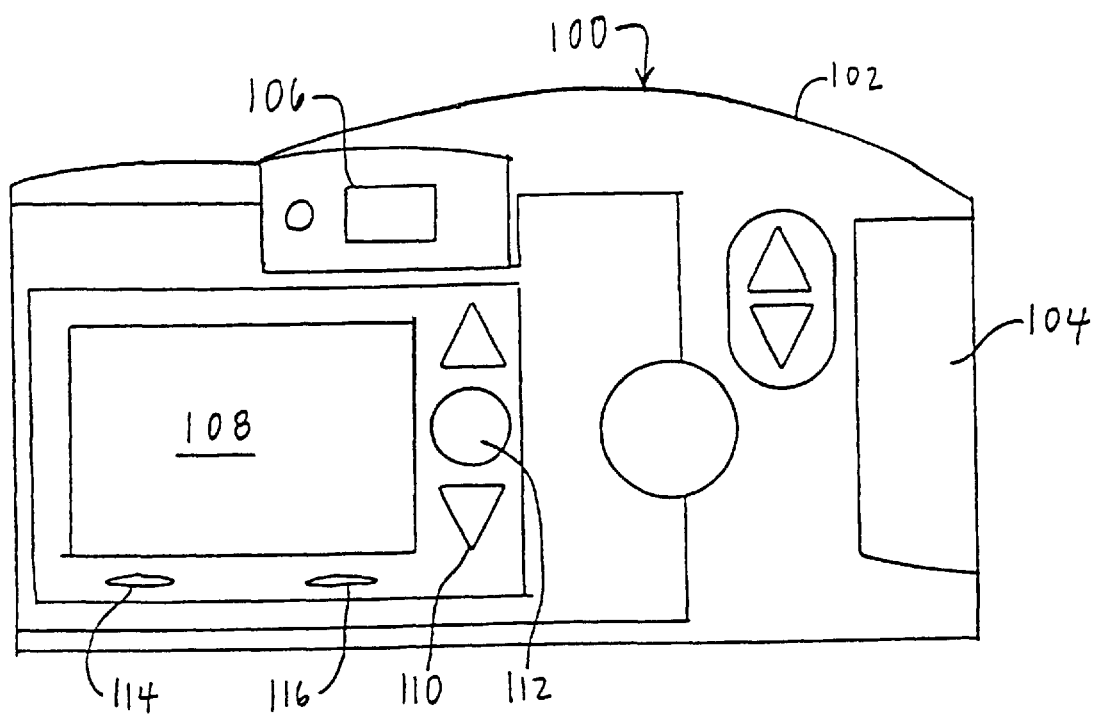
FIG. 1 is a rear elevation view of a personal handheld digital camera.

FIG. 1 is a rear elevation view of a personal handheld digital camera 100. The camera 100 comprises a body 102 generally formed as a rectangular box that can be gripped in the hand using a handgrip 104. A viewfinder 106 is optically coupled to a main lens, so that a user of the camera who wishes to take a picture can look through the viewfinder 106 to line up the shot.

A display device 108 is mounted in the body 102. Stored images and camera settings may be viewed on the display device 108. In one embodiment, the display device 108 is a liquid crystal display (LCD) having a visible area that is approximately 2" (5 cm) in the diagonal dimension. Selection buttons 110, 112, 114, 116 are mounted in the body 102 adjacent to the display 108. The selection buttons 110–116 are used to signal various logical selections of options, commands, etc. based on the contents of the display 108. Use of the buttons 110–116 in the context of transporting digital images is described further below.

Figure 2:
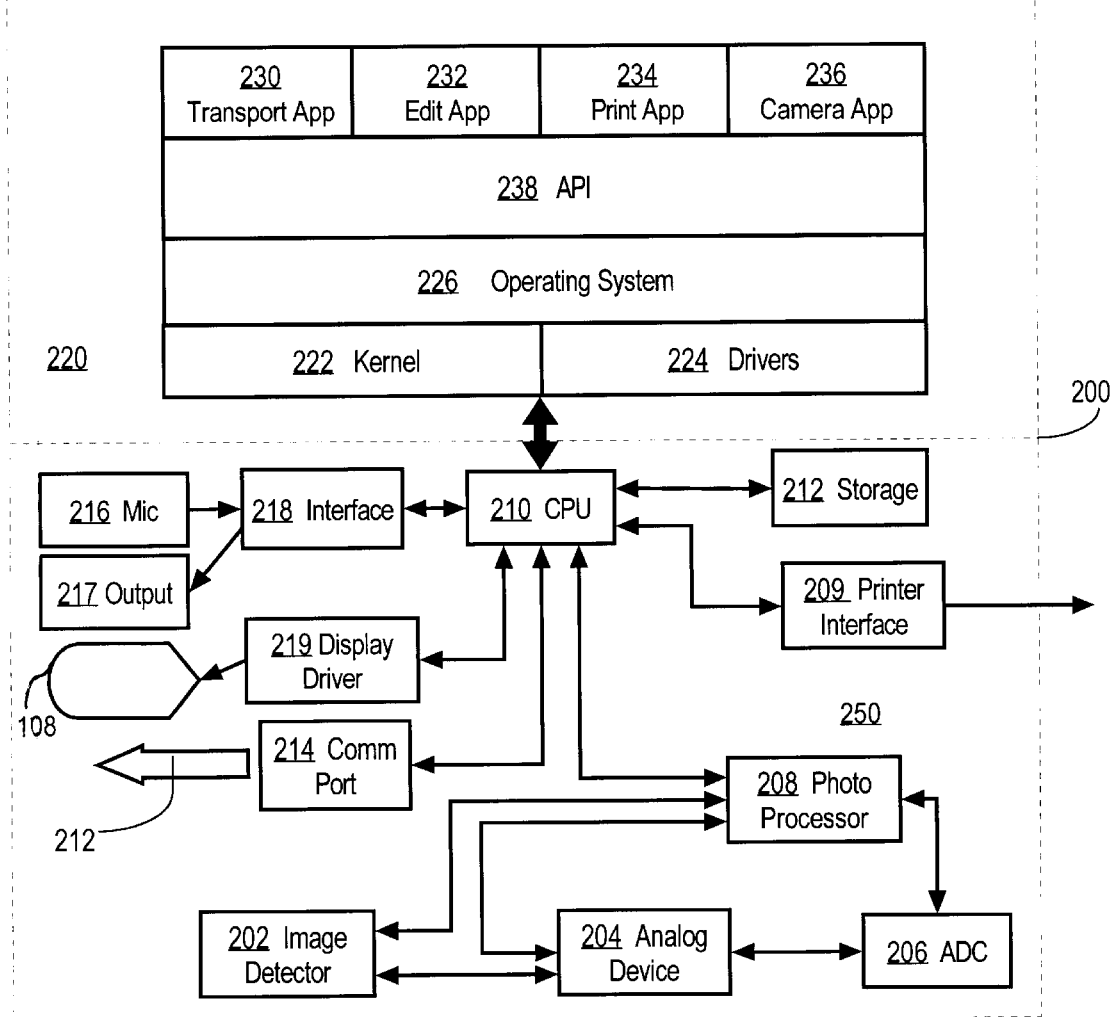
FIG. 2 is a block diagram of selected physical and logical components of a typical digital camera.

FIG. 2 is a block diagram of selected physical and logical components of the digital camera 100 according to an embodiment. Architecture 200 of the digital camera 100 comprises certain software elements 220 and hardware elements 250. Among the hardware elements 250, an image detector 202 is optically coupled to a main lens of the camera 100. As in a conventional camera, a shutter is interposed between the main lens and the image detector 202. When the shutter is opened, the image detector 202 receives light reflected from a subject and focused by the lens, and an image is formed at the image detector. An example of an image detector 202 is a charge-coupled device (CCD) that comprises an array of detectors or elements.

The image detector 202 samples discrete portions of an image at a rate defined by a pixel sample clock. In the preferred embodiment, the pixel sample clocks is part of the circuitry comprising photoprocessor 308. The pixel sample clock, however, could also be a standalone device or could comprise a portion of the circuitry of other devices such as image detector 302. The image detector 302 produces a plurality of analog image signals that are generally proportional to the amount of light falling on the elements of the CCD. The analog image signals are coupled to an analog device 204, also called an analog chip or photo color device. The analog device 204 receives the signals from the CCD and organizes them into a discrete set of analog signals in a pre-determined amount. The analog device is coupled to an analog-digital converter (ADC) 206 that receives the analog signals from the analog device 204, and converts the analog signals into a plurality of digital signals. In preferred embodiments, the ADC 206 carries out 8-bit or 12-bit analog-to-digital conversion. In an alternative embodiment, the analog device 204 could be part of the circuitry that comprises ADC 206.

The ADC 206 provides its digital outputs to a photoprocessor 208. In a preferred embodiment, photoprocessor 208 is implemented as an application specific integrated circuit (ASIC) device that controls operational parameters of the image detector 202 and the analog device 204. The photoprocessor 208 may also buffer or groom the digital signals received from the ADC 206 to improve or modify image quality.

The photoprocessor 208 is coupled to a central processing unit (CPU) 210, which in one embodiment is a microprocessor having a 100 MHz clock cycle. The CPU 210 provides central control for other hardware elements 250 of the architecture 200 and executes software elements 220, as described below. The CPU 210 is coupled to one or more storage devices 212. For example, the CPU 210 is coupled to a flash memory card that provides non-volatile storage of digital images or photos taken by the digital camera 100.

The CPU is also coupled to input/output devices such as a communications port 214. For example, the CPU 210 is coupled to a telephone line 212 through a modem comprised of a coder/decoder (codec) and digital to analog adapter (DAA). Using the modem, the CPU 210 can communicate data over a conventional telephone line to a remote device such as a server, personal computer or workstation, or printer. A modem is merely one example of a device suitable for use as communications port 214. Alternatively, the communications port 214 is an infrared communications device, an Ethernet interface, an ISDN terminal adapter, or another telecommunications device. The specific communication method, protocol or mode used by communications port 214 is not critical.

In the preferred embodiment, CPU 210 also is coupled to a microphone 216 through an appropriate interface 218. Preferably, the microphone 216 is mounted in or on the body 102 of the camera 100. The interface 218 converts analog voice signals received from the microphone 216 into a digital signal representative of the voice signals. The interface 218 enables the CPU 210 to receive, use and manipulate voice commands or voice message information spoken by a user of the digital camera 100 into the microphone 216. The interface 218 preferably is also coupled to an output device 217. The interface can receive digitized audio information, convert it to analog form, pre-amplify the resulting analog signal, and drive the output device 217. In combination, the interface 218 and output device 217 enable the CPU 210 to play digitized audio files or voice messages in an audible way. The output device 217 is a loudspeaker, or an output connector or jack that can be connected to an amplifier and speaker or to a pair of headphones.

The CPU 210 is also coupled to the display device 108 through a display driver 219. The CPU 210 communicates, to the display driver 219, the form and content of information to be displayed on the display device 108. The display driver 219 determines how to display the information and drives the display device 108, for example, by causing the display device 108 to illuminate pixels of an LCD array at appropriate points. In the preferred embodiment, the display device 108 has a touchscreen formed integrally with the display. In this embodiment, the display driver also includes circuitry or firmware for receiving signals from the touchscreen that represent user selection of elements shown in the display. Alternatively, a separate touchscreen driver circuit or chip is used.

In one embodiment, CPU 210 is also coupled to a printer interface 209 that connects to an external image-quality printer. Using printer interface 209, under program control, CPU 210 can command the printer to print a tangible copy of a stored photo. In the preferred embodiment, printer interface 209 communicates data to the printer using infrared light signals. Of course, any other type of printer interface can be used.

In another alternative embodiment, the CPU 210 is coupled to a hot-pluggable external interface. The hot-pluggable external interface enables the digital camera 100 to be connected to a docking station whereby the digital camera 100 may communicate data and images to external computing devices, such as a personal computer.

The CPU 210 executes software elements 220. In the preferred embodiment, the software elements 220 of the architecture 200 are arranged in several logical levels. At the lowest logical level, the CPU 210 executes a kernel 222 and one or more drivers 224, which cooperate to control and supervise the hardware elements 250. For example, the drivers 224 include a driver program that controls and supervises operation of the image detector 202, the analog device 204, and the photoprocessor 208.

The CPU 210 executes an operating system 226. The operating system 226 is arranged at a logic level higher than the kernel 222 and drivers 224, so that the operating system 226 can use services embodied in the kernel and drivers. In the preferred embodiment, the operating system 226 is the Microsoft Windows CE operating system.

An application programming interface (API) 238 is logically interposed between the operating system 226 and one or more application programs 230–236. The API 238 provides an application programming interface (API) so that the application programs 230–236 may use services of the operating system 226, kernel 222 and drivers 224 by calling functions organized according to high-level abstractions. In this configuration, the application programs 230–236 are insulated from implementation details or intricacies of the operating system 226, kernel 222 and drivers 224. In the preferred embodiment, the API 238 provides functions accessible through function calls that express abstract program behavior and simplify application program development. For example, the API 238 provides functions for retrieving images, storing images, manipulating image elements, receiving or outputting information, and other functions.

In the preferred embodiment, the CPU 210 executes a transport application 230, an edit application 232, a print application 234, and a camera control application 236. Generally, the transport application 230 provides image transport functions, enabling a user of the digital camera 100 to send one or more stored pictures or images from the camera to one or more external addresses. The edit application 232 provides image editing functions, enabling a user of the digital camera 100 to edit, retouch, or alter one or more stored pictures or images while they are stored in the camera. The print application 234 provides image printing functions, enabling a user of the digital camera 100 to print one or more stored images directly from the camera to a printer. The camera control application 236 provides camera control functions, enabling a user of the digital camera 100 to adjust settings of the camera, such as the exposure time, flash on/off, zoom, whether manual focus or autofocus is enabled, red eye removal, flash fill, exposure intensity, etc. In alternate embodiments, other application programs are executed.

In alternative embodiments, the software elements 220 are implemented in the form of firmware or hardwired circuitry that carries out the functions described herein. Implementation in software in this arrangement is not required. Preferably, a user of the digital camera 100 selects and activates one of the application programs 230–236 by choosing an icon representing the desired application program from a display shown on the display device 108.

Noise Cancellation Circuit Architecture

Figure 3:
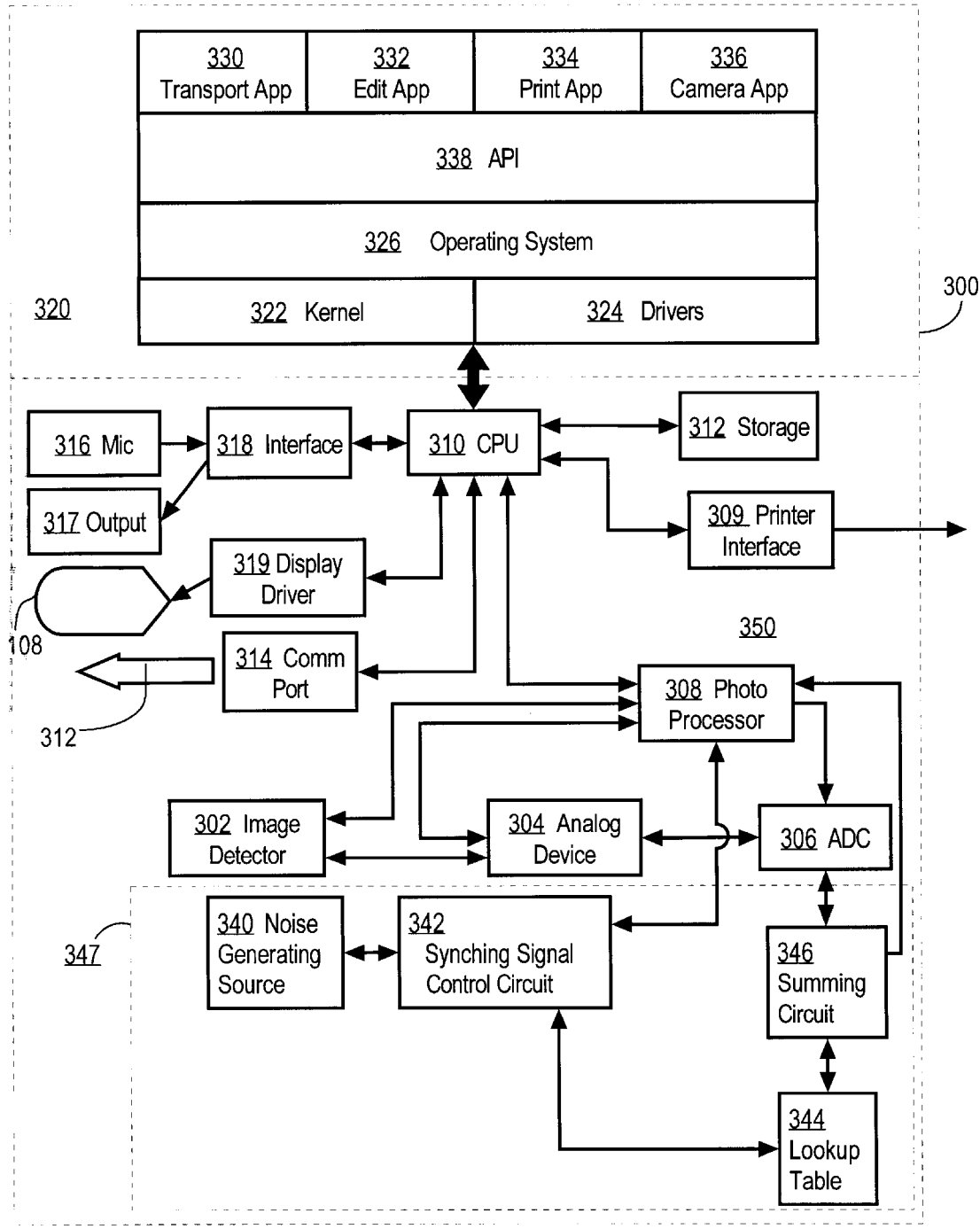
FIG. 3 is a block diagram of selected physical and logical components of a digital camera that includes components of a noise cancellation circuit according to an embodiment.

FIG. 3 shows a camera architecture 300 that includes architecture 200 of FIG. 2, additionally comprising noise-generating source 340, synching signal control circuit 342, lookup table 344 and summing circuit 346.

When noise is radiated by noise-generating source 340 into an analog signal leaving image detector 302, the corresponding plurality of digital signals output from ADC 306 will include a signal component that is derived from the radiated noise. This signal component may originally be superimposed onto the analog signal that leaves image detector 302, or the signal component may be directly radiated into a portion of a signal path between image detector 302 and summing circuit 346. In either case, the radiated noise signal becomes a component of the digital signal output of ADC 306. Here digital signal output is used interchangeably with plurality of digital signals. Elements 340–346 comprise a noise cancellation circuit 347 that can cancel the effects of noise radiated into the analog image signal leaving image detector 302.

While the elements of noise cancellation circuit 347 are shown as stand-alone devices in the preferred embodiment, they could also be part of a single integrated circuit.

The noise-generating source 340 can be any one of a number of noise-generating sources that reside either internally in the camera 100 or that are externally based.

The lookup table 344 stores digital representations of anti-noise signals. Also, depending on the types of noise generated, the lookup table 344 could consist of a number of lookup tables. Where multiple lookup tables are involved, each lookup table could contain anti-noise values associated with a particular mode of camera 100, such as movie mode or still image mode. The noises generated in movie mode, for example, involve the viewing of a live image, which suggests that zoom and focus motors of the camera are likely on. In still mode, in contrast, an image is actually captured, which suggests that the zoom and focus motors are likely off. In still mode then, the noise generated by noise-generating source 340 may be affected by the zoom and focus motors, and may therefore require a different anti-noise value to combat the generated noise. Multiple lookup tables, therefore, are one way to store the various classes of noise for a given noise-generating source based upon the camera mode. Alternatively, a linked list approach using address pointers, a stack, or a database table could be employed in place of the lookup table 344. In the preferred embodiment, the lookup table is implemented in a stand-alone memory device, but it could be integrated with summing circuit 346. Each anti-noise signal in the lookup table 344 is a complement to a specific radiated noise signal generated by a noise-generating source. Each anti-noise signal comprises a plurality of values, each value being associated with a discrete point in the signal and each value being stored in the lookup table. Each select discrete point of the anti-noise signal has an absolute instantaneous magnitude that is substantially equal to a corresponding discrete point of a specific radiated noise signal. Each select discrete point of the anti-noise signal also has a polarity that is opposite that of the corresponding discrete point of the radiated noise signal.

Anti-noise signals are characterized and stored in the lookup table 344 prior to the actual photographic operation of digital camera 100. For example, a designer, developer, or manufacturer of architecture 300 may determine that an element of the architecture is generating noise. The noise signal is measured using appropriate test and measurement equipment, and recorded. A complement of the noise signal is created or computed, digitized, and stored in lookup table 344.

The noise-generating source 340 is representative of any internal or external source that radiates noise into the analog image signal leaving image detector 302, or that causes noise to be conducted into the signal path between image detector 302 and summing circuit 346. In electronic cameras, such noise could be generated by power supplies, motor drivers, battery-chargers, or flash-charging circuits. As long as the noise can be identified, characterized and controlled, the noise can be eliminated using the principles of the present invention. Alternatively, noise generating source 340 may be implemented in the form of one or more signal paths that connect synching signal control circuit 342 to an element of architecture 300 that is known to generate noise.

After the source of the radiated noise signal has been identified and characterized, and the complementary anti-noise signal is developed and stored, the CPU 310 may be programmed to notify photoprocessor 308 whenever the noise-generating source 340 is to be activated. The photoprocessor 308, in turn, sends a signal to the synching signal control circuit 342 to synchronize the operation of the synching signal control circuit 342 with the pixel sample clock of photoprocessor 308. The synching signal control circuit 342 thereafter sends a synchronized control signal to the noise-generating source 340 and to the lookup table 344. The signal controls the operation and timing of noise radiated by the noise-generating source 340. The signal also designates what anti-noise value in the lookup table 344 should be delivered to the summing circuit 346, and controls the timing of the delivery of that anti-noise value to the summing circuit 346. The anti-noise signal and the digital signal output of ADC 306 that includes the signal component derived from radiated noise are summed by the summing circuit 346 some predetermined time after the control signal is sent.

In an alternative embodiment, the synching signal control circuit 342 may also provide information to the summing circuit 346. For example, synching signal control circuit 342 may notify the summing circuit 346 that a control signal has been sent to the noise-generating source 340, and may identify the location in the lookup table 344 of the anti-noise signal corresponding to the specific radiated noise generated by the noise-generating source 340. In response to receiving an identification signal from synching signal control circuit 342, summing circuit 346 selects one of the anti-noise signals from lookup table 344, and sums the selected anti-noise signal with the digital signal output of ADC 306. Notification to the summing circuit 346 that a control signal has been sent will establish the timing of the summation of a digital signal from analog-digital converter 306 and the anti-noise signal. Identification of the location of the anti-noise signal in the lookup table 344 is useful because multiple noise-generating sources may be present. Proper identification allows the summing circuit 346 to select the correct anti-noise signal to utilize during the summing process. If only one type of noise is being dealt with, identification information would not be necessary. In that case, lookup table 344 would only contain values representative of one anti-noise signal. The notification and identification information may be sent directly from the synching signal control circuit 342 to the summing circuit 346. Alternatively, the identification and notification information could be provided to the summing circuit 346 from the lookup table. The notification and identification information sent from synching signal control circuit 342 to summing circuit 346 is timely delivered so that summing circuit 346 can add an appropriate anti-noise signal, selected from lookup table 344, to the digital signal output of ADC 306. Each select discrete point of the anti-noise signal has an instantaneous absolute magnitude that is substantially equal to that of a corresponding discrete point of the digital signal output component that is derived from radiated noise. Each select discrete point of the anti-noise signal also has a polarity that is opposite that of the corresponding discrete point of the digital signal output component derived from radiated noise. Accordingly, the anti-noise signals stored in lookup table 344 are complementary signals to their respective corresponding radiated noise signals. Therefore, summation of the anti-noise signal and the digital signal having a radiated noise signal component should occur at some predetermined time after the control signal is sent to noise-generating source 340 in order to result in noise cancellation.

The synching signal control circuit 342 synchronizes the noise that is radiated by noise-generating source 340 by using a pulse of a pixel sample clock that forms part of photoprocessor 308. As a result, the summing circuit 346 sums the anti-noise signal obtained from lookup table 344 with the digital signal output of ADC 306 at the appropriate time. The summing circuit 346 adds the digital signal output of ADC 306 and the anti-noise signal to cancel the component of the digital signal that is derived from radiated noise.

The resulting noise-canceled signal output from summing circuit 346 is sent to photoprocessor 308 on path 352. The image can be displayed, processed for reproduction and the like.

The electronic noise cancellation circuit 347 does not affect feedback operations between photoprocessor 308, analog device 304 and ADC 306 because the summing circuit 346 only adds an anti-noise signal to the digital signal output of ADC 306 when noise has actually been radiated into the signal output of image detector 302.

Figure 3A:
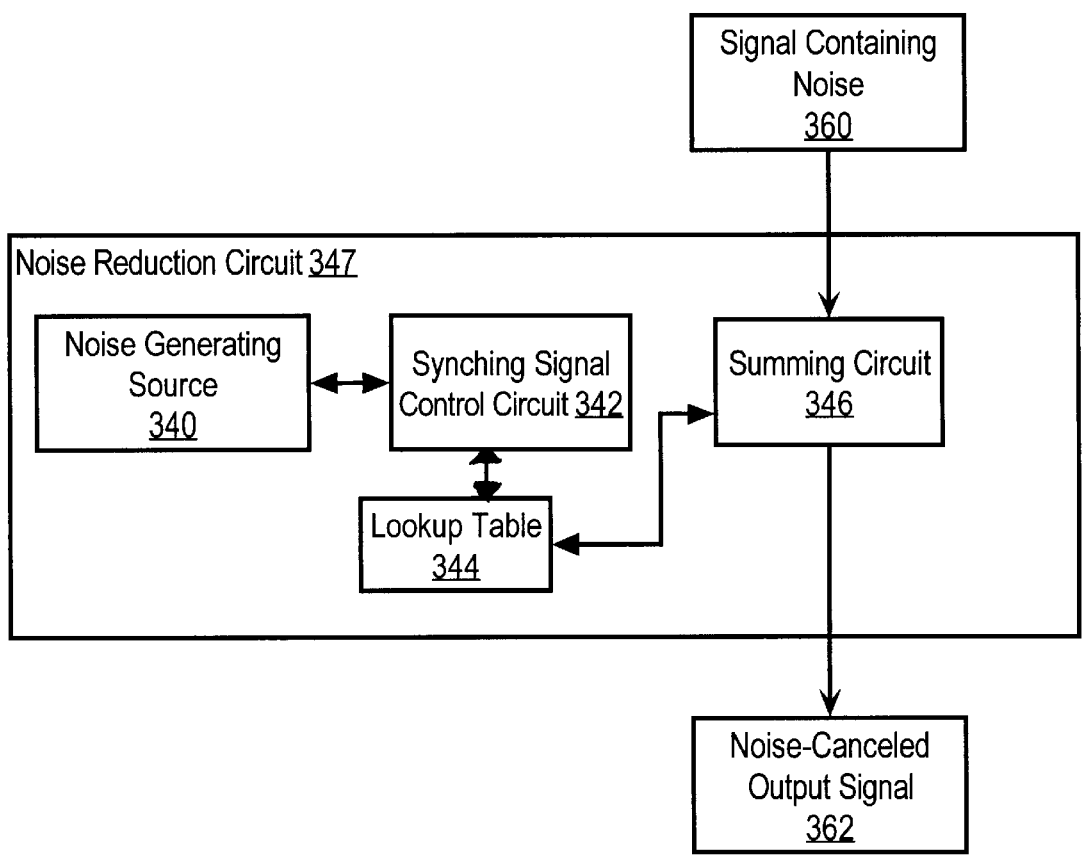
FIG. 3(a) is a block diagram showing the noise cancellation circuit of FIG. 3 in isolation.

FIG. 3(a) is a block diagram showing the noise cancellation circuit 347 of FIG. 3 in isolation. The noise cancellation circuit 347 comprises noise-generating source 340, synching signal control circuit 342, lookup table 344 and summing circuit 346. The noise-reduction circuit 347 can be used in any application where a noise-generating source can be identified, where the generated noise can be characterized and where the timing of the generation of the noise can be controlled.

A signal containing noise 360 arrives at summing circuit 346 and is summed with a corresponding anti-noise signal from lookup table 344. The synching signal control circuit 342 sends a control signal to control the timing of the noise generated by the noise-generating source 340. The control signal is also sent to the lookup table 344, designating what anti-noise value in the lookup table 344 should be delivered to summing circuit 346 and controlling the timing of the delivery of that anti-noise value to the summing circuit 347.

In an alternative embodiment, the synching signal control circuit 342 may also provide information to the summing circuit 346. For example, the synching signal control circuit 342 may also send information to the summing circuit 346 that identifies the appropriate anti-noise signal in lookup table 344 to sum with the signal containing noise 360. The synching signal control circuit 342 may also notify the summing circuit 346 that a control signal has been sent to said noise-generating source 360. The resulting signal leaving summing circuit 346 is noise-canceled output signal 362.

Noise Cancellation Circuit Method

FIGS. 5(a)–(e) show representative waveforms of the following: a pixel sample clock pulse, a control signal, a radiated noise signal, an anti-noise signal and a resultant noise signal component. The representative waveforms are useful in understanding the noise cancellation method.

FIG. 5(a) depicts a pixel sample clock pulse 500 waveform that may be generated by, for example, the pixel sample clock of image detector 302.

FIG. 5(b) shows a control signal 510 waveform that is synchronized with the pixel sample clock pulse 500 waveform shown in FIG. 5(a). For example, when the noise-generating source 340 is a power supply having a power transistor for controlling turn-on and turn-off of the power supply, the control signal 510 is sent from the synching signal control circuit 342 at a specific time and tells the power transistor when to turn on or off, thereby controlling the power supply and any accompanying radiated noise. Thus, the control signal 510 controls the timing of the noise radiated by the power supply.

FIG. 5(c) shows a representative radiated noise signal waveform 520. For example, the radiated noise generated by a power supply turning on and off would produce radiated noise signal waveform 520.

FIG. 5(d) shows a representative anti-noise signal waveform 530 for canceling a radiated noise waveform. For example, the anti-noise signal waveform 530 is complementary to and would cancel radiated noise signal waveform 520 of FIG. 5(c) if the waveforms are summed.

FIG. 5(e) shows a representative resultant noise signal component waveform 540 when anti-noise signal waveform 530 is summed with the radiated noise signal waveform 520.

Figure 4:
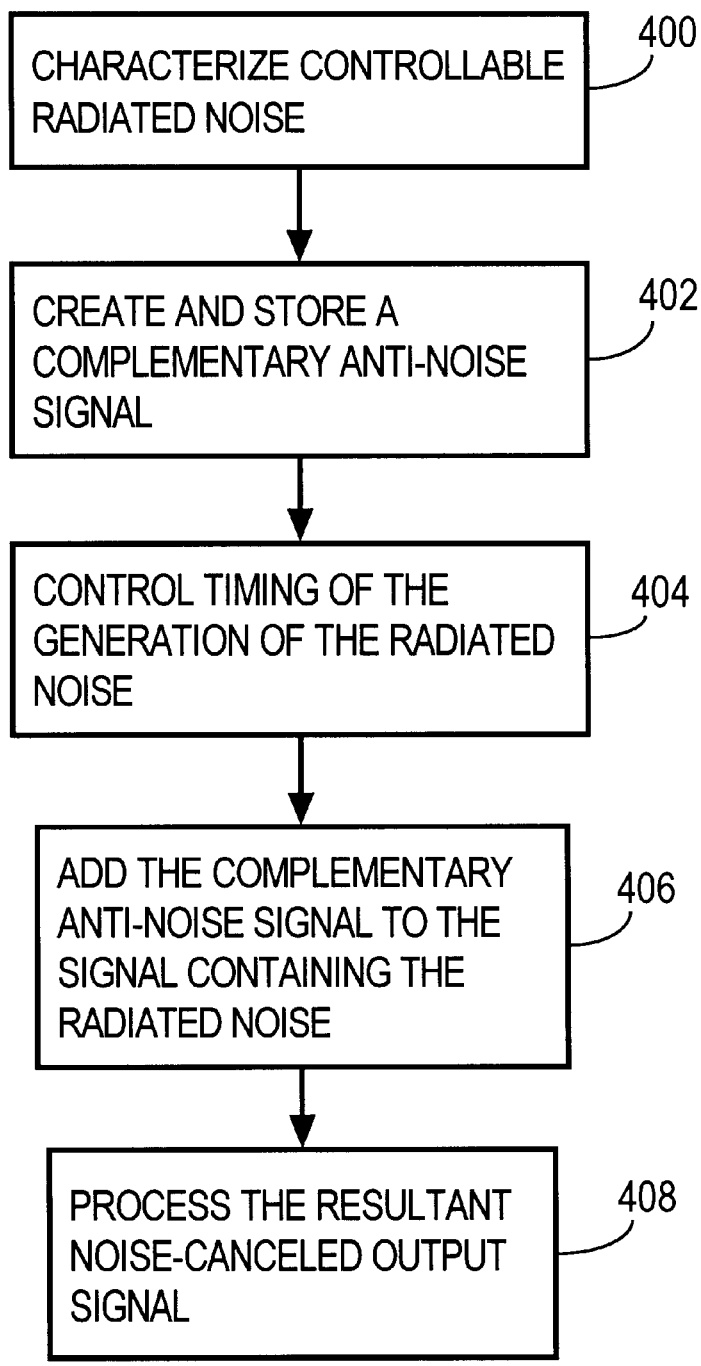
FIG. 4 is a flow chart illustrating the method for canceling radiated noise according to an embodiment.

FIG. 4 is a flow chart describing an embodiment of a method of canceling the effect of radiated noise on a signal.

Referring to FIG. 4, at block 400, characterization of controllable radiated noise is carried out. For example, controllable radiated noise in a digital camera 100 is characterized as radiated noise signal waveform 520. The source of the noise could be image detector 302 or could originate from elsewhere in the system. The noise-generating source 340 may either radiate noise into an analog signal leaving image detector 302 or cause noise to be conducted into the electronic signal path between image detector 302 and summing circuit 346. The radiated noise is controllable and capable of being isolated and characterized. For example, in an embodiment where the noise-generating source 340 is a power supply, and where turn-on and turn-off of the power supply are controlled by a power transistor, any noise radiated by turn-on and turn-off of the power supply can be controlled by controlling the timing of transistor conduction and non-conduction.

The radiated noise signal waveform 520 is determined by isolating the radiated noise signal apart from any analog signal generated by image detector 302. In the embodiment where camera 100 has a power supply as the noise-generating source 340, isolation of the radiated noise signal component is accomplished by covering the main lens coupled to image detector 302, prior to any photographic operation, and measuring the electronic signal along the electronic signal path between image detector 302 and summing circuit 346 when the power supply switches on and off. Covering the lens prevents the image detector 302 from detecting objects and from converting the image of a target object into an electronic signal. Accordingly, there should be no image signal in the signal path. Therefore, switching of the power supply while the lens is covered will allow the radiated noise signal component to be viewed in isolation. When the lens is uncovered during actual photographic operation of camera 100, the radiated noise component will still be present when the power supply switches, albeit in the form of a superimposed signal component on the image signal.

At block 402, a complementary anti-noise signal is created and stored. For example, anti-noise signal waveform 530 (FIG. 5(d)) is developed and stored as a plurality of digital values in lookup table 344. The anti-noise signal waveform 530 is derived from radiated noise signal waveform 520 (FIG. 5(c)). Each select discrete point of the anti-noise signal waveform 530 has an instantaneous absolute magnitude that is substantially equal to that of a corresponding discrete point of the radiated noise signal waveform 520, and a polarity opposite that of the corresponding discrete point of the radiated noise signal waveform 520. A digital representation of the developed anti-noise signal waveform 530 is stored in lookup table 344, to be accessed by the summing circuit 346 whenever the noise-generating source 340 is activated.

At block 404, the timing of the generation of radiated noise is controlled. For example, in the preferred embodiment a control signal is sent to noise-generating source 340 to trigger generation of radiated noise. Synchronization is achieved by initiating control signal 510 (FIG. 5(b)) simultaneously with the trailing leg of pixel sample clock pulse 500 (FIG. 5(a)). As a result, the radiated noise signal waveform 520 is generated at the trailing leg of the pixel sample clock pulse 500 as well. The control signal 510 could be initiated at other points. For instance, the signal could be sent at the leading edge of pixel sample clock pulse 500.

At block 406, the complementary anti-noise signal is added to the signal that contains the radiated noise. For example, radiated noise from the noise-generating source 340 can be cancelled by summing the digital representation of the anti-noise signal waveform 530 in lookup table 344 to the digital signal output of ADC 306 when the digital signal output contains a noise signal component. The empirical digital values that represent the anti-noise signal waveform 530 in lookup table 344 are actually summed with empirical digital values that represent the appropriate encroached digital signals having the radiated noise signal waveform 520 as a component. The anti-noise signal is added to the digital signal output of ADC 306 at a precisely determined time to ensure that an appropriate radiated noise signal is cancelled. Precise timing is achieved by synchronizing the generation of the radiated noise, via the control signal 510, to the pixel sample clock pulse 500, and thereafter summing said anti-noise signal and said digital signal output of ADC 306 at some predetermined time after said clock pulse. The control signal 510 also designates what anti-noise value in the lookup table 344 should be delivered to the summing circuit 346, and controls the timing of the delivery of that anti-noise value to the summing circuit 346. The CPU 310 may be programmed to instruct summing circuit 346 to perform the summing operation within a specific number of clock pulses after the control signal 510 is sent to the noise-generating source 340.

In an alternative embodiment, precise timing of the summation of the anti-noise signal and the digital signal output of ADC 306 is achieved by synching signal control circuit 342 providing notification information to the summing circuit 346 indicating that a control signal 510 has been sent to the noise-generating source 340. The notification information ensures that the anti-noise signal is added to the digital signal output of ADC 306 at the appropriate time. Also, where multiple noise-generating sources are involved, information identifying the location of the appropriate complementary anti-noise signal is generated. For example, the synching signal control circuit 342 provides information identifying the location of the digital representation of the anti-noise signal waveform 530 in the lookup table 344 to the summing circuit 346 so that the proper anti-noise signal is summed with the digital signal output of ADC 306.

At block 408, a resultant noise-canceled output signal is processed. For example, a noise-canceled digital image signal, without the radiated noise signal component, leaves summing circuit 346 and is thereafter received and processed by photoprocessor 308 according to the methods previously described.

FIG. 5(e) shows a representative resultant noise signal component waveform 540. For example, if the digital signal output of ADC 306 has a noise signal component characterized by radiated noise signal waveform 520 and is summed with an anti-noise signal characterized by anti-noise signal waveform 530, the noise signal component of the resulting digital signal would be resultant noise signal component waveform 540.

In operation of one embodiment, image detector 302 detects incident light from an object and an image is formed. The image is converted into an analog signal and started along a signal path to be reproduced. Noise-generating source 340, which in one embodiment is a power switching supply circuit having a power transistor for switching the supply circuit on and off, is triggered into operation by a control signal 510 from synching signal control circuit 342. The control signal 510 is synchronized with pixel sample clock pulse 500 such that radiated noise signal waveform 520 is generated by noise-generating source 340 also in synchronization with pixel sample clock pulse 500. The control signal 510 also designates what anti-noise value in the lookup table 344 should be delivered to the summing circuit 346, and synchronizes and controls the timing of the delivery of that anti-noise value to the summing circuit 346. In the preferred embodiment, the trailing leg of pixel sample clock pulse 500 is the synchronization point.

The analog image signal is delivered to ADC 306 and emerges as a plurality of digital signals. The digital signal contains a component that is the radiated noise signal waveform 520. The digital signal containing this radiated noise signal component is delivered to summing circuit 346. At the summing circuit 346, a digital representation of anti-noise signal waveform 530, the anti-noise signal waveform 530 being a predetermined complementary signal to the radiated noise signal waveform 520, is obtained from lookup table 344.

The summing circuit 346, at some predetermined time after pixel sample clock pulse 500, sums the digital representation of the anti-noise signal waveform 530 from the lookup table 344 with a digital representation of the digital signal from ADC 306, effectively canceling out the radiated noise signal waveform 520 component of the digital signal. Thus, the resulting noise-canceled output signal emerging from the summing circuit 346 comprises primarily a digital image signal.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A noise cancellation circuit for use in canceling radiated noise generated by a noise-generating source, said noise cancellation circuit being implemented in a device having an analog-digital converter that receives and converts an analog signal into a plurality of digital signals, the circuit comprising:

a control means for controlling the timing of the radiated noise, said radiated noise being radiated into the signal path of said analog signal such that said plurality of digital signals include a signal component derived from said radiated noise;

a storage means that stores an anti-noise signal that comprises a digital representation of a complement of said signal component derived from said radiated noise; and a summing means for summing said plurality of digital signals output from said analog-digital converter that include said signal component derived from said radiated noise with said anti-noise signal, said anti-noise signal being delivered from said storage means to said summing means.

2. The noise cancellation circuit of claim 1, wherein said control means controls said timing of said radiated noise by sending a control signal to said noise-generating source, said control signal being sent in synchronization with a clock pulse and thereby causing said noise-generating source to generate said radiated noise also in synchronization with said clock pulse.

3. The noise cancellation circuit of claim 1, wherein each select discrete point of said anti-noise signal has an instantaneous absolute magnitude that is substantially equal to that of a corresponding discrete point of said signal component derived from said radiated noise, and a signal polarity opposite that of said corresponding discrete point of said signal component derived from said radiated noise.

4. The noise cancellation circuit of claim 1, wherein said summing comprises adding digital values representative of said plurality of digital signals that include said signal component derived from said radiated noise with digital values representative of said anti-noise signal some predetermined time after a given clock pulse.

5. The noise cancellation circuit of claim 1, wherein said radiated noise is isolated and measured.

6. The noise cancellation circuit of claim 1, wherein said control means provides information to said storage means identifying said anti-noise signal, said anti-noise signal being one of a plurality of anti-noise signals in said storage means, as the anti-noise signal to be delivered to said summing means.

7. The noise cancellation circuit of claim 1, wherein said control means controls the timing of the delivery of said anti-noise signal delivered to said summing means by sending a control signal in synchronization with a clock pulse.

8. The noise cancellation circuit of claim 1, wherein said radiated noise is generated by a power switching circuit.

9. A method for canceling the effect of radiated noise on a signal, comprising the steps of:
  characterizing a signal component that is derived from radiated noise;
  creating and storing an anti-noise signal that comprises a digital representation of a complement of said signal component derived from said radiated noise;
  controlling the timing of said radiated noise, said radiated noise being radiated into the signal path of said signal;
  providing a digital representation of said signal that includes said signal component that is derived from said radiated noise; and
  summing said digital representation of said signal and said anti-noise signal,
  whereby said summing cancels the effect of said radiated noise on said signal.

10. The method of claim 9, further comprising the step of generating a control signal in synchronization with a clock pulse to control said timing of said radiated noise, said control signal initiating generation of said radiated noise also in synchronization with said clock pulse.

11. The method of claim 9, further comprising the step of providing each select discrete point of said anti-noise signal with an instantaneous absolute magnitude that is substantially equal to that of a corresponding discrete point of said signal component derived from said radiated noise, and with a signal polarity opposite that of said corresponding discrete point of said signal component derived from said radiated noise.

12. The method of claim 9, further comprising the step of adding digital values representative of said signal that includes said signal component derived from said radiated noise with digital values representative of said anti-noise signal some predetermined time after a clock pulse.

13. The method of claim 9, further comprising the step of isolating and measuring said radiated noise.

14. The method of claim 9, further comprising the step of providing information that identifies said anti-noise signal, from among a plurality of anti-noise signals, as the anti-noise signal to be summed with said digital representation of said signal.

15. The method of claim 9, further comprising the step of controlling the timing of said summing of said digital representation of said signal and said anti-noise signal.

16. A method for canceling the effect of radiated noise on the reproduction of an image, comprising the steps of:
  converting an image formed from an incident light into an analog signal by sampling discrete portions of said image at a rate according to a plurality of clock pulses;
  controlling the timing of radiated noise, said radiated noise being radiated into the path of said analog signal;
  converting said analog signal into a plurality of digital signals, said plurality of digital signals including a signal component derived from said radiated noise;
  storing an anti-noise signal that comprises a digital representation of a complement of said signal component derived from said radiated noise; and
  summing said plurality of digital signals that include said signal component derived from said radiated noise with said anti-noise signal.

17. An electronic camera having circuitry to cancel the effect of radiated noise on the reproduction of an image, said electronic camera comprising:
  an image pickup device for converting the image of an object formed by a lens system into an analog signal, said image pickup device sampling discrete portions of said image at a rate defined by pulses of a sample clock;
  a control means for controlling the timing of radiated noise, said radiated noise being radiated into the signal path of said analog signal;
  an analog-digital converter that receives and converts said analog signal into a plurality of digital signals, said plurality of digital signals including a signal component derived from said radiated noise;
  a storage means that stores an anti-noise signal that comprises a digital representation of a complement of said signal component derived from said radiated noise; and
  a summing means for summing said plurality of digital signals that include said signal component derived from said radiated noise with said anti-noise signal, said anti-noise signal being delivered from said storage means to said summing means.

18. The electronic camera of claim 17, wherein said control means sends a control signal to a noise-generating source, said control signal being sent in synchronization with a given pulse of said sample clock and thereby causing said noise-generating source to generate said radiated noise also in synchronization with said given pulse of said sample clock.

19. The electronic camera of claim 17, wherein each select discrete point of said anti-noise signal has an instantaneous absolute magnitude that is substantially equal to that of a corresponding discrete point of said signal component derived from said radiated noise, and a signal polarity opposite that of said corresponding discrete point of said signal component derived from said radiated noise.

20. The electronic camera of claim 17, wherein said summing comprises adding digital values representative of said plurality of digital signals that include said signal component derived from said radiated noise with digital values representative of said anti-noise signal some predetermined time after a given pulse of said sample clock.

21. The electronic camera of claim 17, wherein said radiated noise is isolated and measured.

22. The electronic camera of claim 17, wherein said control means provides information to said storage means identifying the location of said anti-noise signal, said anti-noise signal being one of a plurality of anti-noise signals in said storage means, as the anti-noise signal to be delivered to said summing means.

23. The electronic camera of claim 17, wherein said control means controls the timing of the delivery of said anti-noise signal delivered to said summing means by sending a control signal in synchronization with a given pulse of said sample clock.

24. The electronic camera of claim 17, wherein said radiated noise is generated by a power switching circuit.

25. An electronic camera having circuitry to cancel the effect of radiated noise on the reproduction of an image, said electronic camera comprising:

an image pickup device for converting the image of an object formed by a lens system into an analog signal, said image pickup device sampling discrete portions of said image at a rate defined by pulses of a sample clock;

a control means for controlling the timing of radiated noise that is radiated into the signal path of said analog signal by a noise-generating source, said control means controlling the timing of said radiated noise by sending a control signal to said noise-generating source, said control signal being sent in synchronization with a given pulse of said sample clock and thereby causing said noise-generating source to generate said radiated noise also in synchronization with said given pulse of said sample clock;

an analog-digital converter that receives and converts said analog signal into a plurality of digital signals, said plurality of digital signals including a signal component that is derived from said radiated noise generated by said noise-generating source;

a storage means that stores an anti-noise signal that comprises a digital representation of a complement of said signal component derived from said radiated noise, wherein each select discrete point of said anti-noise signal has an instantaneous absolute magnitude that is substantially equal to that of a corresponding discrete point of said signal component derived from said radiated noise, and a signal polarity opposite that of said corresponding discrete point of said signal component derived from said radiated noise; and a summing means for summing said plurality of digital signals that include said signal component derived from said radiated noise and said anti-noise signal, said anti-noise signal being delivered from said storage means to said summing means, whereby said summing cancels the effect said radiated noise will have on said electronic camera's reproduction of said image.

26. The electronic camera of claim 25, wherein said summing comprises adding digital values representative of said plurality of digital signals that include said signal component derived from said radiated noise with digital values representative of said anti-noise signal some predetermined time after said given pulse of said sample clock.

27. The electronic camera of claim 25, wherein said control means provides information to said storage means identifying the location of said anti-noise signal, said anti-noise signal being one of a plurality of anti-noise signals in said storage means, as the anti-noise signal to be delivered to said summing means.

28. The electronic camera of claim 25, wherein said control means controls the timing of the delivery of said anti-noise signal delivered to said summing means by sending a control signal in synchronization with said given pulse of said sample lock.

29. A noise cancellation circuit for use in canceling radiated noise generated by a noise-generating source, said noise cancellation circuit being implemented in a device having an analog-digital converter that receives and converts an analog signal into a plurality of digital signals, the circuit comprising:

a synching signal control circuit for controlling the timing of radiated noise, said radiated noise being radiated into the signal path of said analog signal such that said plurality of digital signals include a signal component derived from said radiated noise;

a lookup table that stores an anti-noise signal that comprises a digital representation of a complement of said signal component derived from radiated noise; and a summing circuit for summing said plurality of digital signals that include said signal component derived from said radiated noise with said anti-noise signal, said anti-noise being delivered from said lookup table to said summing circuit.

30. The noise cancellation circuit of claim 29, wherein said synching signal control circuit sends a control signal to said noise-generating source, said control signal being sent in synchronization with a clock pulse and thereby causing said noise-generating source to generate said radiated noise also in synchronization with said clock pulse.

31. The noise cancellation circuit of claim 29, wherein each select discrete point of said anti-noise signal has an instantaneous absolute magnitude that is substantially equal to that of a corresponding discrete point of said signal component derived from said radiated noise, and a signal polarity opposite that of said corresponding discrete point of said signal component derived from said radiated noise.

32. The noise cancellation circuit of claim 29, wherein said summing comprises adding digital values representative of said plurality of digital signals that include said signal component derived from said radiated noise with digital values representative of said anti-noise signal some predetermined time after a given clock pulse.

33. The noise cancellation circuit of claim 29, wherein said radiated noise is isolated and measured.

34. The noise cancellation circuit of claim 29, wherein said synching signal control circuit provides information to said summing circuit identifying the location of said anti-noise signal in said lookup table.

35. The noise cancellation circuit of claim 29, wherein said synching signal control circuit provides notification information to said summing circuit indicating that a control signal has been sent to activate said noise-generating source.

36. The noise cancellation circuit of claim 29, wherein said radiated noise is generated by a power switching circuit.

37. The noise cancellation circuit of claim 29, wherein said synching signal control circuit provides information to said lookup table identifying said anti-noise signal, said anti-noise signal being one of a plurality of anti-noise signals in said lookup table, as said anti-noise signal to be delivered to said summing circuit.

38. The noise cancellation circuit of claim 29, wherein said synching signal control circuit controls the timing of the delivery of said anti-noise signal delivered to said summing circuit by sending a control signal in synchronization with a pulse of a sample clock.

* * * * *